United States Patent
Dalmolen et al.

(10) Patent No.: US 9,841,126 B2
(45) Date of Patent: Dec. 12, 2017

(54) HIGH PRESSURE PIPE AND USE THEREOF

(71) Applicant: Pipelife Nederland B.V., Enkhuizen (NL)

(72) Inventors: Lambertus Gerrit Peter Dalmolen, Zaandam (NL); Willem Gerard Frans Sengers, Amsterdam (NL)

(73) Assignee: Pipelife Nederland B.V., Enkhuizen (NL)

( * ) Notice: Subject to any disclaimer, the term of this patent is extended or adjusted under 35 U.S.C. 154(b) by 4 days.

(21) Appl. No.: 15/044,487

(22) Filed: Feb. 16, 2016

(65) Prior Publication Data

US 2016/0238165 A1     Aug. 18, 2016

(30) Foreign Application Priority Data

Feb. 17, 2015 (EP) ..................................... 15155428

(51) Int. Cl.
| | |
|---|---|
| *F16L 9/14* | (2006.01) |
| *F16L 11/08* | (2006.01) |
| *C09D 123/06* | (2006.01) |
| *B32B 1/08* | (2006.01) |
| *B32B 27/20* | (2006.01) |

(Continued)

(52) U.S. Cl.
CPC .............. *F16L 11/081* (2013.01); *B32B 1/08* (2013.01); *B32B 27/12* (2013.01); *B32B 27/20* (2013.01); *B32B 27/32* (2013.01); *C09D 123/06* (2013.01); *F16L 1/00* (2013.01); *F16L 9/121* (2013.01); *F16L 9/123* (2013.01); *B32B 2255/02* (2013.01); *B32B 2264/00* (2013.01); *B32B 2264/102* (2013.01); *B32B 2307/306* (2013.01); *B32B 2307/50* (2013.01); *B32B 2307/54* (2013.01); *B32B 2597/00* (2013.01); *C08L 2207/062* (2013.01); *F16L 11/082* (2013.01)

(58) Field of Classification Search
CPC ........ F16L 11/081; F16L 11/082; F16L 9/123; F16L 9/121
USPC ......................... 138/123–125, 137, 140, 129
See application file for complete search history.

(56) References Cited

U.S. PATENT DOCUMENTS

| | | | | |
|---|---|---|---|---|
| 5,803,131 A | * | 9/1998 | Iwasa ........................ | B32B 1/08 138/137 |
| 6,889,716 B2 | * | 5/2005 | Lundberg ................ | F16L 9/123 138/124 |

(Continued)

FOREIGN PATENT DOCUMENTS

| | | |
|---|---|---|
| DE | 297 13 786 U1 | 9/1997 |
| DE | 20 2008 015520 U1 | 4/2010 |

(Continued)

OTHER PUBLICATIONS

EP Search Report, dated Jul. 31, 2015, from corresponding EP application.

*Primary Examiner* — Patrick F Brinson
(74) *Attorney, Agent, or Firm* — N.V. NLO; Catherine A. Shultz

(57) ABSTRACT

A high pressure pipe of high density polyethylene material includes an internal lining (3), an intermediate reinforcement layer (2) and an outer cover layer (1). The high density polyethylene material of the internal lining (3) is filled with a filling material (5). As a result, the mixture of high density polyethylene and filling material provides resistance against higher temperatures, allowing the pipe to be able to transport fluids at elevated temperatures.

18 Claims, 2 Drawing Sheets

(51) Int. Cl.
    *B32B 27/32*    (2006.01)
    *F16L 9/12*     (2006.01)
    *B32B 27/12*    (2006.01)
    *F16L 1/00*     (2006.01)

(56) References Cited

U.S. PATENT DOCUMENTS

| | | | |
|---|---|---|---|
| 9,012,001 B2* | 4/2015 | Christensen | F16L 11/10 428/34.1 |
| 2004/0144440 A1 | 7/2004 | Lundberg et al. | |
| 2010/0218839 A1* | 9/2010 | Conley | B29C 44/1285 138/130 |
| 2012/0261017 A1* | 10/2012 | Christensen | F16L 11/10 138/137 |
| 2016/0017131 A1* | 1/2016 | Almaadeed | C08L 23/06 524/449 |

FOREIGN PATENT DOCUMENTS

| EP | 2 502 864 A1 | 9/2012 |
|---|---|---|
| WO | 2013/071449 A1 | 5/2013 |

* cited by examiner

HIGH PRESSURE PIPE AND USE THEREOF

FIELD OF THE INVENTION

The invention is related to a high-pressure pipe of high density polyethylene material, comprising an internal lining, an intermediate reinforcement layer and an outer cover layer. Such pipes are generally known and are used for various purposes.

BACKGROUND OF THE INVENTION

The pipes in question are relatively economical having regard to the low-cost polyethylene material. However, said polyethylene material poses restrictions on the possible applications of the pipe.

SUMMARY OF THE INVENTION

A high pressure pipe of high density polyethylene material includes an internal lining, an intermediate reinforcement layer and an outer cover layer. The high density polyethylene material of the internal lining is filled with a filling material. As a result, the mixture of high density polyethylene and filling material provides resistance against higher temperatures, allowing the pipe to be able to transport fluids at elevated temperatures.

A method of use of a high pressure pipe of high density polyethylene comprising an internal lining filled with a filling material, an intermediate reinforcement layer, and an outer cover layer, includes transporting a fluid having a temperature of at least 60° C.

BRIEF DESCRIPTION OF THE DRAWINGS

The invention will be described further with respect to the embodiment shown in the drawings.

DETAILED DESCRIPTION OF THE INVENTION

Figure 1:
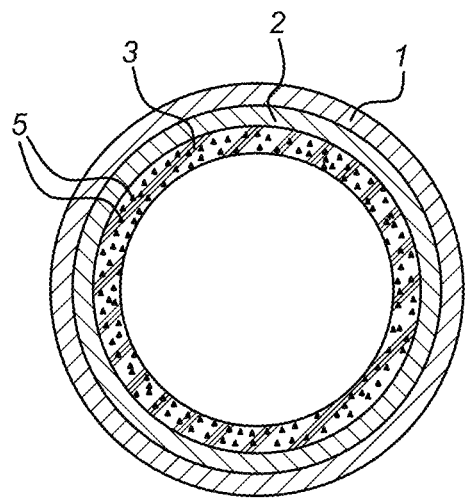
FIG. 1 shows a cross-section of the pipe.

As mentioned in the Background, applications of a high-pressure pipe of high density polyethylene material are sometimes limited due to different properties. For example, the pipes should not be subjected to temperatures above about 60° C., as at such temperatures the polyethylene material thereof would soften up and the ring stiffness would be become too low to resist collapse due to the external pressures. Furthermore, the pipes are not fit for certain types of fluids such as hydrocarbons, which contain components, which act as a plasticizer. The polyethylene material of the pipe would also soften up merely as a result of the exposure to such fluids. Moreover swelling of the pipe material would occur. In the end these phenomena would lead to pipe failure.

For certain applications, such as in the offshore oil industry, alternative materials such as polyamide 11 or 12 are applied. Materials of this type are certified for hydrocarbons at elevated temperatures of up to 85° C. However, the cost of such pipes is prohibitive for most onshore applications in relation to the transport of hydrocarbons.

Nevertheless, as polyethylene is inert with respect to the components of hydrocarbons, it would still be desirable to use this material for these applications. An object of the invention is therefore to provide an improved high-pressure pipe of high density polyethylene. A further object is to provide a high-pressure pipe of high density polyethylene which has a better resistance against softening up and swelling under the influence of hydrocarbons. Another object is to provide a high-pressure pipe of high density polyethylene which is more resistant against elevated temperatures of up to 85° C. and higher in some cases. Yet another object is to provide a high-pressure pipe of high density polyethylene which is able to resist internal pressures of up to 250 bar.

These and other objects are achieved in that the high-density polyethylene material of the internal lining is filled with a filling material. It appears that the mixture of high-density polyethylene and filling material provides a higher modulus of elasticity of the polyethylene material whereby the resistance against collapse due to external pressure and the resistance to high temperatures is increased. Moreover, it appears that such mixture of a polyethylene material with a filler material is less prone to swelling and softening up under the influence of hydrocarbons.

It is pointed out that the application of filling material, such as talcum, in high-density polyethylene pipes is used in some past pipes. In such prior art pipes, the pipe wall over its full thickness consist of polyethylene material which is filled with filling material, The filling typically used is of low-cost material which merely serves to reduce the amount of polyethylene used.

In contrast, the high-pressure pipe according to the invention comprises several layers including a reinforcement layer. The internal lining of this pipe consist of high density polyethylene material, while the filler material acts to counter the effects of swelling and softening up in contact with transporting fluids such as hydrocarbons, as well as the effects of elevated temperatures.

The filling material can comprise a mineral, e.g. talcum or mica. In some embodiments, the filling material may comprise nanoparticles. The particles of the filler material may have several shapes. According to a first possibility, the particles are platelets or are plate-shaped. Such plate-shaped particles can be arranged in overlapping fashion, e.g. according to a roof-tile arrangement. Thereby, the particles are able to transfer forces which may be generated in the inner layer under the influence of external and internal loads. Thus, the pipe is able to withstand relatively high loadings, and at the same time the influence of the plasticizing effect of the fluid which is being transported is mitigated. Such a plate or platelet shape can thus help in the improvement of material properties, particularly in retaining sufficient modulus of elasticity at higher temperatures due to shape causing more interactions between the plates or platelets.

Alternatively, the particles are fiber-shaped or rod-shaped, for example, in the form of wollastonite. The ratio of the weight of the filling material over the total internal lining weight can be in the range of 1% to 20% of the lining pipe, though in some embodiments it could be more or less. The particles can have an aspect ratio of at least a factor of two, in some embodiments of an order of magnitude, and in further embodiments, three orders of magnitude larger or smaller than 1.

The reinforcement layer may comprise helically wrapped layers consisting of tensile members, for example, fibers such as high-strength man-made fiber, glass fiber or metal such as steel. High-strength man-made fiber can be characterized by a specific strength of more than 500 mN/tex, such as para-aramid fiber, carbon fiber, and polyester fiber. Such members may be interwoven, for example, like a braid.

The reinforcement layer may comprise fibers, for example, fibers which are arranged according to angles of +54° and −54° with respect to the longitudinal pipe axis.

The invention is furthermore related to the use of a high pressure pipe of high density polyethylene for transporting a fluid having a temperature in the range of 50° C.-100° C. The pipe can be used for transporting fluids at a temperature of at least 60° C., in some cases, at least 70° C. Furthermore, the invention is related to the use of a high pressure pipe of high density polyethylene as described before for transporting a fluid at a pressure in the range of 20-500 bar, in particular for transporting hydrocarbons. The pressure can be, for example, at least 100 bar.

Figure 2:
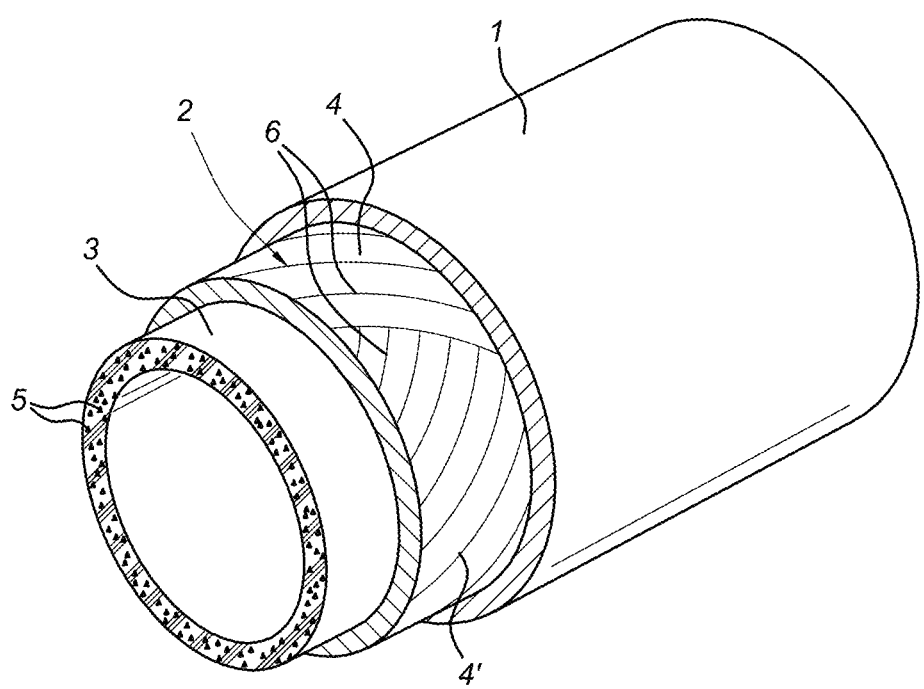
FIG. 2 shows a view in perspective of the pipe, with partly removed layers.

A pipe shown in cross-section in FIG. 1 consists of an outer coating layer 1, an intermediate reinforcement layer 2 and an internal lining 3. The internal lining layer comprises a high-density polyethylene material. The reinforcement layer comprises fibre layers 4, 4' each having parallel fibres. The fibres 6 of the one fibre layer 4 are oriented at 54° with respect to the longitudinal axis of the pipe, the fibres 6 of the other fibre layer 4' are oriented at −54°. These fibers can be helically wrapped tensile member layers. This orientation is shown in the view of FIG. 2. Other orientations are also possible in other embodiments.

Figure 3:
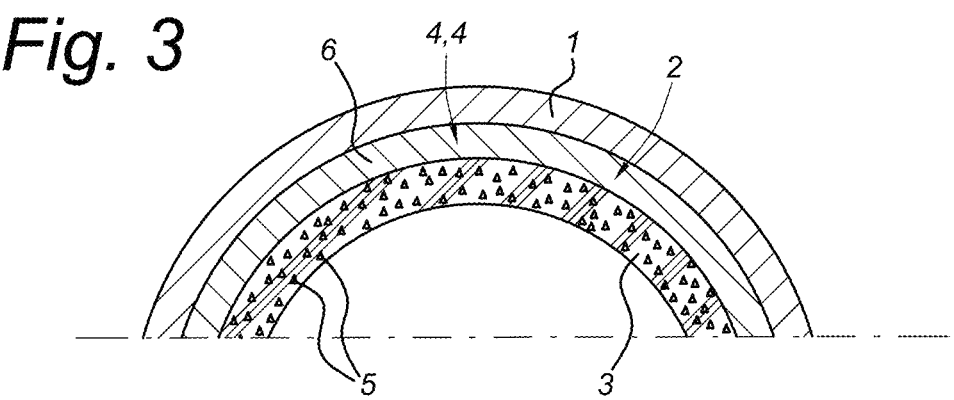
FIG. 3 shows an enlarged detail.

In the enlarged cross-sectional detail of the pipe wall as shown in FIG. 3, the polyethylene material of the internal lining 3 is filled with a filling material 5 of particles. This filling material may consist of a mineral, such as talcum or mica platelets, or rods. The filling material 5 may also consist of nanoparticles. The filling material increases the modulus of elasticity of the internal lining 3, and increases the resistance thereof against swelling in case hydrocarbons are transported through the pipe in question. As a result of the increased stiffness of the lining, the pipe is fit for transporting fluids at relatively high pressures and temperatures. Moreover, the use of filler materials decreases the plasticizing effect of hydrocarbons on the lining 3.

Thus, a pipe is obtained at a relatively low cost due to the application of high density polyethylene material for the internal lining, which at the same time is fit for transporting aggressive fluids such as hydrocarbons at elevated temperatures and/or pressures due to the filling in the high density polyethylene lining material.

LIST OF REFERENCE NUMERALS

1. Coating layer
2. Reinforcement layer
3. Lining
4, 4' Reinforcement fiber layer
5. Filling material
6. Fibre While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A high pressure pipe of high density polyethylene material, comprising:
   an internal lining,
   an intermediate reinforcement layer, and
   an outer cover layer, wherein the high density polyethylene material of the internal lining is filled with a filling material, wherein the filling material increases the modulus of elasticity of the internal lining and increases the resistance thereof against swelling.

2. The pipe according to claim 1, wherein the filling material comprises a mineral.

3. The pipe according to claim 2, wherein the mineral comprises talcum or mica.

4. The pipe according to claim 1, wherein the filling material comprises nanoparticles.

5. The pipe according to claim 4, wherein particles of the filling material are plate-shaped.

6. The pipe according to claim 5, wherein the plate-shaped particles are arranged in overlapping fashion.

7. The pipe according to claim 1, wherein particles of the filling material comprise platelets.

8. The pipe according to claim 1, wherein the filling material particles are fiber-shaped or rod-shaped.

9. The pipe according to claim 4, wherein an aspect ratio of nanoparticles is at least a factor of two.

10. The pipe according to claim 1, wherein the reinforcement layer comprises fibers.

11. The pipe according to claim 10, wherein the fibers are arranged according to angles of +54 and −54 degrees with respect to the longitudinal pipe axis.

12. The pipe according to claim 1, wherein the weight of the filling material over the total internal lining weight is comprised in the range of 1% to 20% of the pipe weight.

13. The pipe according to claim 1, wherein the reinforcement layer comprises helically wound tensile material.

14. The pipe according to claim 13, wherein the tensile material comprises fibers and/or metal wire.

15. A method of use of a high pressure pipe comprising an internal lining of high density polyethylene filled with a filling material, an intermediate reinforcement layer, and an outer cover layer, wherein the filling material increases the modulus of elasticity of the internal lining and increases the resistance thereof against swelling, the method comprising:
   transporting a fluid having a temperature of at least 60° C.

16. The method of claim 15, wherein the fluid has a pressure in the range of 20-500 bar.

17. The method of claim 15, wherein the fluid comprises hydrocarbons.

18. A pipe comprising:
   an internal lining of a high density polyethylene material mixed with a filling material,
   an intermediate reinforcement layer, and
   an outer cover layer, wherein the filling material comprises platelets and/or talcum, wherein the filling material increases the modulus of elasticity of the internal lining and increases the resistance thereof against swelling.

* * * * *